United States Patent [19]

Walter

[11] Patent Number: 5,535,622
[45] Date of Patent: Jul. 16, 1996

[54] BRAKE PERFORMANCE MONITORING

[75] Inventor: David T. Walter, Milton Keynes, Great Britain

[73] Assignee: Wichita Company Limited, Bedford, United Kingdom

[21] Appl. No.: 455,222

[22] Filed: May 31, 1995

[30] Foreign Application Priority Data

Jun. 1, 1994 [GB] United Kingdom ............... 9410906

[51] Int. Cl.$^6$ .................................................. G01L 5/00
[52] U.S. Cl. ............................................ 73/121; 73/862.01
[58] Field of Search ........................... 73/121, 122, 129, 73/130, 132, 862.01, 862.041, 862.044, 862.451, 862.49

[56] References Cited

U.S. PATENT DOCUMENTS

| | | | |
|---|---|---|---|
| 2,449,091 | 9/1948 | Starling | 73/121 |
| 3,692,153 | 9/1972 | Eastcott et al. | 188/170 |
| 3,772,914 | 11/1973 | Pohl et al. | 73/121 |
| 3,867,838 | 2/1975 | Gerresheim | 73/862.044 |
| 3,937,074 | 2/1976 | Burkett | 73/121 |
| 4,100,792 | 7/1978 | Leiber | 73/121 |
| 4,625,568 | 12/1986 | Hartung et al. | 73/862.04 |
| 4,665,755 | 5/1987 | Stalder | 73/862.01 |
| 4,982,815 | 1/1991 | Arabori et al. | 187/105 |
| 5,038,605 | 8/1991 | Tews et al. | 73/862.54 |
| 5,076,401 | 12/1991 | Ta et al. | 188/71.9 |
| 5,131,268 | 7/1992 | Dillmann | 73/121 |
| 5,168,750 | 12/1992 | Kurtz | 73/132 |
| 5,255,760 | 10/1993 | Lamb et al. | 188/1.11 |
| 5,265,468 | 11/1993 | Holst et al. | 73/129 |

FOREIGN PATENT DOCUMENTS 1590904  6/1981  United Kingdom .

Primary Examiner—Richard Chilcot
Assistant Examiner—George M. Dombroske
Attorney, Agent, or Firm—MacMillan, Sobanski & Todd

[57] ABSTRACT

A brake performance monitor has a first sensor 12 for detecting movement of a brake device to apply the brake, and a second sensor 14 for detecting a predetermined force necessary to apply the brake in normal operating conditions. If the braking force deteriorates, the brake movement is detected before the predetermined force is reached, and an output device 10 signals the fault, for example by halting the machinery 4 being braked.

5 Claims, 1 Drawing Sheet

BRAKE PERFORMANCE MONITORING

BACKGROUND OF THE INVENTION

The invention relates to monitoring the performance of a brake, specifically a brake which is biased to its operational or braking position.

For safety reasons, machinery which requires to be braked is frequently fitted with brakes which are biased to be operative, that is, to apply a braking effect to the machinery, so that this can operate only by the application to the brake of a controllable force opposing the bias. Typically such a brake device will be actuated by a compression spring or springs, the device being held inoperative to allow operation of the machinery in which it is incorporated by application, pneumatically, hydraulically or electrically, of a disengaging or balance force.

In such a brake device, the braking force available from the springs may reduce with time for various reasons. For example, wear in friction components in the brake device can cause the compressed length of the springs to increase. Also, one (or more) of the springs might lose some or all of its force through gradual softening, or fail through actual fracture or through rapid softening.

The result of any reduction in the spring force would be a reduction in the braking effect. If this reduction is gradual, as would occur because of friction component wear or gradual softening of the springs, the reduced braking force may well be detected because the machinery takes longer to stop or because of a change in the position to which the machinery comes to rest, as in the case of a mechanical press or shear which is desirably brought to rest at a predetermined position, typically top dead centre. Such effects should be noted during normal maintenance and the brake overhauled accordingly.

However, if the reduction in the spring braking force is more rapid, as because of component failure, or rapid softening of the springs, the resulting reduction in brake performance may not be seen until a failure to stop the machinery occurs. The consequences of such a brake failure could be serious, and could include injury to persons, particularly when the brake device is intended to stop the machinery in the event of an emergency.

SUMMARY OF THE INVENTION

The invention accordingly provides a system for monitoring the performance of a brake which is moved to its inoperative condition by selective application of a disengaging force, the system comprising a first sensor responsive to movement of the brake device from the engaged or operative position, and a second sensor responsive to the disengaging force, and an output device providing a signal when the first sensor senses the movement of the brake device before the second sensor senses a disengaging force of a predetermined level.

In normal condition of the brake, the spring or springs, or other means tending to apply a braking force, will not be moved by the disengaging force until this has reached a certain level corresponding to the predetermined level. The second sensor is arranged to provide an output only when this level has been reached, so that the first sensor output will occur subsequently in normal conditions. However, if the braking force declines, the disengaging force needed to effect the movement sensed by the first sensor will occur before the predetermined level has been reached and the output device will signal that a braking force reduction has occurred.

It may be preferred to allow for some decline of the braking force before activation of the output device and the second sensor can then be set to provide its output at a predetermined pressure level, which may be selectively adjustable, which is lower than that required to effect the sensed brake movement.

The output device signal can be employed to provide a visual and/or audible indication and/or to stop the machinery incorporating the brake, as by cutting off the machinery power supply. If the signal is employed to stop the machinery, the system preferably includes further features which ensure that the machinery cannot thereafter be restarted until some specific step has been taken to ensure effective brake operation.

BRIEF DESCRIPTION OF THE DRAWINGS

The invention is further described below, by way of example, with reference to the accompanying drawings in which.

DETAILED DESCRIPTION OF THE PREFERRED EMBODIMENT

Figure 1:
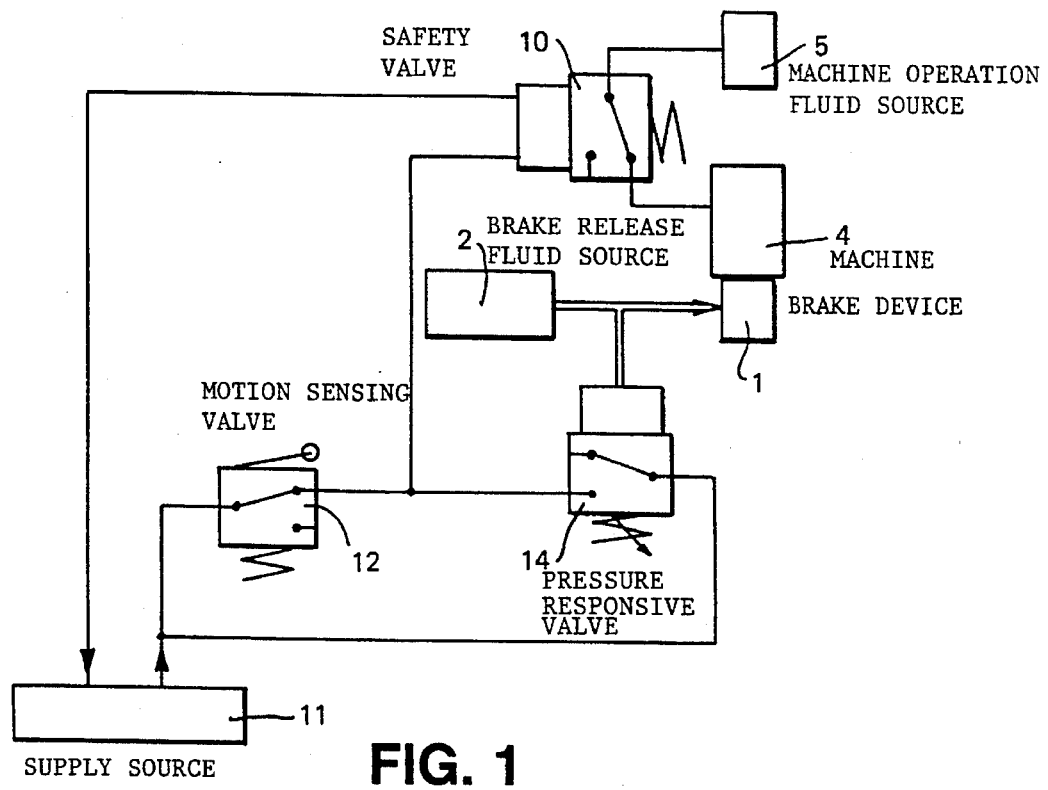
FIG. 1 is a schematic circuit drawing of a first monitoring system embodying the invention.

The system illustrated in FIG. 1 monitors the performance of a brake device 1 of a known kind in which a spring, or more usually a plurality of springs, urges the device into its engaged or operative position. The brake device 1 can be moved to its disengaged or inoperative condition by a disengaging force applied hydraulically by way of pressure fluid from a source 2. The operation of the system does not depend on the way in which the disengaging force is applied and pneumatic or electrical disengaging means could be employed instead.

The brake device 1 can act to bring to a halt machinery 4 which is powered hydraulically from a source 5. The machinery 4 may be for example a mechanical press which operates cyclically, between rest positions in which a drive is disconnected by means of a clutch and the press is braked by the brake device 1. The machinery 4 could be powered electrically, by a controlled stop/start electric motor.

The supply of power from the source 5 to the machinery 4 is dependent on the position of an hydraulic safety valve 10 of the monitoring system which is spring biassed to the open position in which the supply is interrupted. If the machinery 4 were electrically powered, the valve 10 could be replaced by a fluid operated electric switch. The safety valve 10 is normally held in its closed position by fluid pressure from a source 11 which reaches the valve 10 through a first sensor in the form of a motion sensing valve 12. The valve 12 is spring biassed to its closed position but can be moved mechanically to its open position by movement of the braking device 1 from its operative position.

Power from the supply source 11 can reach the safety valve 10 by an alternative path through a second sensor in the form of a pressure responsive valve 14. The valve 14 is spring biassed to the open position but moves to the closed position in response to the application of brake-releasing pressure from the source 2 to the brake device 1.

In normal operation, the position of the valves 10, 12 & 14 is as shown in FIG. 1. Safety valve 10 is held closed because valve 12 is closed, so that operation of the machinery 4 is enabled.

Release of the brake device 1 by pressure from source 2 closes valve 14 when the pressure reaches a predetermined level set just below the level at which the brake device begins to move. This brake device movement causes valve 12 to open, but power supply to the machinery 4 is not interrupted because valve 10 is held closed by fluid pressure through valve 14. When the braking force is again applied, the reduced pressure applied to valve 14 will cause this to open, but the movement of the brake device to the engaged position will cause closure of the valve 12, so the power supply to the machinery 4 is not interrupted.

If however the brake device 1 is defectively applying a low braking force, this will be detected during the brake release operation. This is because brake movement will be sensed by valve 12 before the pressure applied to the brake device reaches the predetermined level set by the spring bias of the valve 14. Supply to the valve 10 through valve 12 is thus interrupted before the alternative supply through valve 14 becomes available. Safety valve 10 then opens and the machinery 4 cannot operate.

The pressure at which valve 14 closes can be set at a rather lower level than that at which brake movement causes valve 12 to close if desired to allow for normal wear. The spring bias of valve 14 can be made selectively adjustable for this purpose.

Figure 2:
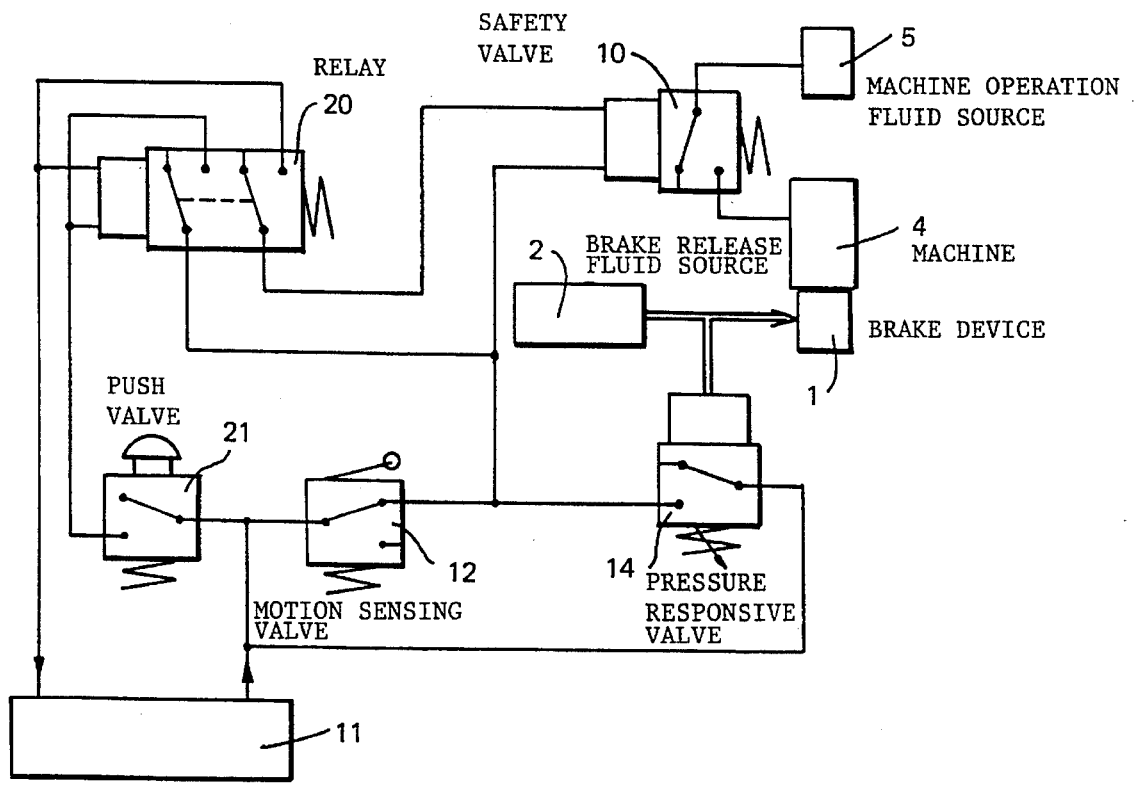
FIG. 2 is a schematic circuit drawing of a second monitoring system in accordance with the invention.

It will be evident that fluid pressure will eventually be restored to the safety valve 10 through valve 14 as the pressure from source 2 rises beyond what was needed to effect the brake device movement. The arrangement of FIG. 1 consequently provides no more than an interruption to the power supply to the machinery 4. Whilst this might be a sufficient indication of brake deterioration, it may be preferred to provide for a positive action to be required to restore machine operation. A fluid circuit such as that shown in FIG. 2 can then be employed. In FIG. 2, parts similar to those of FIG. 1 are indicated by the same reference numerals.

The circuit of FIG. 2 additionally includes a double hydraulic relay 20 spring-biassed to the open condition, and an hydraulic push valve 21, spring-biased to the open position. Closure of the push valve 21 causes the relay 20 to move to its closed position against the spring bias. The closure of the relay 20 completes first and second circuits. The first circuit maintains the relay 20 closed through the valve 12 (or valve 14). The second circuit is from the source 11, through valve 12 or valve 14, and through safety valve 10 and the relay back to the source.

The circuit of FIG. 2 requires to be set up by momentary closure of the push valve 21 to move the relay 20 to its closed position. When pressure is applied to the brake device 1 to release the braking force, and brake movement is sensed after the valve 14 closes the system remains in its set-up condition because the relay 20 is now held closed through the valve 14 additionally when this closes and through this valve only when valve 12 opens.

If however valve 12 opens before the rising pressure applied to the brake device closes valve 14, the pressure supply holding the relay 20 in its closed position is interrupted, together with the pressure supply to the safety valve 10. The relay 20 consequently drops back to the open position illustrated under pressure of its spring bias and the eventual closure of valve 14 cannot now cause the safety valve 10 to close because the return line back to the source 11 is interrupted by the relay 20. The safety valve 10 can be restored to its closed position to enable operation of the machinery 4 only by further operation of the push valve 21 to close the relay 20.

Thus a positive manual action is required to restore the machinery 4 to operation after reduced brake pressure has been sensed. If appropriate, the push switch can be key-controlled.

It will be evident that the pressure signal to the safety valve 10 in either of the hydraulic circuits illustrated can be employed to control pneumatic or electric supply to the machinery, and additionally or instead to operate a visual or audible warning of the condition of the brake device 1.

Although the embodiments illustrated operate hydraulically, it will be evident that the circuit could operate pneumatically, where high speed operation is not required, or electrically, or electronically, when the circuit could be incorporated in a microprocessor control for the machinery. Different forms of the sensors can be employed, according to the manner of realization of the circuit. Thus, a strain gauge could be employed instead of the pressure responsive valve 14. The brake movement could be sensed optically, by interruption of an infrared beam, for example, or by a proximity switch. Where the machinery is a mechanical press incorporating a clutch, the first sensor might constitute a microswitch responsive to separation of the clutch plates.

It will thus be evident that the invention can be embodied in a variety of ways other than as specifically illustrated and described.

What is claimed is:

1. A system for monitoring the performance of a brake which is movable to its inoperative condition by selective application of a disengaging force, the system comprising:

a first sensor responsive to movement of the brake device from the engaged or operative position, a second sensor responsive to the disengaging force, and an output device responsive to the first and second sensors to provide a signal only when the first sensor senses the movement of the brake device before the second sensor senses a disengaging force of a predetermined level.

2. A system as claimed in claim 1, in which the second sensor can be set to provide its output at a predetermined level of force, which is selectively adjustable, and which is lower than that required to effect the sensed brake movement.

3. A system as claimed in claim 1, in which the output device signal is a visual and/or audible indication.

4. A system as claimed in claim 1, in which the output device signal stops the machinery incorporating the brake.

5. A system as claimed in claim 4, in which the machinery cannot be re-started after having been stopped by the output device signal until a predetermined step has been taken to ensure effective brake operation.

\* \* \* \* \*